(12) United States Patent
Izdepski et al.

(10) Patent No.: US 8,180,371 B1
(45) Date of Patent: May 15, 2012

(54) SYSTEM AND METHOD FOR MOBILE DEVICE SELF-LOCATION

(75) Inventors: Erich J. Izdepski, Falls Church, VA (US); Wing K. Lee, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 393 days.

(21) Appl. No.: 12/543,451

(22) Filed: Aug. 18, 2009

(51) Int. Cl.
*H04W 24/00* (2009.01)
*H04W 4/00* (2009.01)

(52) U.S. Cl. .................. 455/456.1; 455/456.5

(58) Field of Classification Search ............ 455/456.5, 455/456.1, 62, 435.1, 436, 12.1; 342/387, 342/465, 357.29; 370/338, 337, 328
See application file for complete search history.

(56) References Cited

U.S. PATENT DOCUMENTS

| | | | |
|---|---|---|---|
| 6,249,252 B1 | 6/2001 | Dupray | |
| 6,405,044 B1 | 6/2002 | Smith et al. | |
| 6,449,486 B1 | 9/2002 | Rao | |
| 6,505,046 B1 | 1/2003 | Baker | |
| 6,760,582 B2 | 7/2004 | Gaal | |
| 6,801,778 B2 | 10/2004 | Koorapaty et al. | |
| 6,961,367 B2 | 11/2005 | Simic et al. | |
| 7,057,557 B2 * | 6/2006 | Lee | 342/465 |
| 7,092,722 B1 | 8/2006 | Oh et al. | |
| 7,236,879 B2 * | 6/2007 | Tsunehara et al. | 701/408 |
| 7,242,950 B2 * | 7/2007 | Suryanarayana et al. | 455/456.5 |
| 7,343,317 B2 | 3/2008 | Jokinen et al. | |
| 7,376,430 B2 | 5/2008 | Matsuda | |
| 7,400,884 B2 | 7/2008 | Fok et al. | |
| 7,945,271 B1 | 5/2011 | Barnes et al. | |
| 8,010,134 B2 | 8/2011 | Barnes et al. | |
| 2002/0086680 A1 | 7/2002 | Hunzinger | |
| 2002/0167444 A1 * | 11/2002 | Lee | 342/387 |
| 2003/0008668 A1 | 1/2003 | Perez-Breva et al. | |
| 2003/0065805 A1 | 4/2003 | Barnes, Jr. | |
| 2004/0140361 A1 | 7/2004 | Paul et al. | |
| 2004/0162090 A1 * | 8/2004 | Suryanarayana et al. | 455/456.5 |
| 2004/0198386 A1 | 10/2004 | Dupray | |
| 2004/0243519 A1 | 12/2004 | Perttila et al. | |
| 2005/0192024 A1 | 9/2005 | Sheynblat | |
| 2006/0089153 A1 | 4/2006 | Sheynblat | |
| 2006/0178932 A1 | 8/2006 | Lang | |
| 2007/0161380 A1 | 7/2007 | Fok et al. | |

(Continued)

FOREIGN PATENT DOCUMENTS

WO    2008112401 A1    9/2008

OTHER PUBLICATIONS

Barnes, James D., et al., "Location Inference Using Radio Frequency Fingerprinting," U.S. Appl. No. 11/779,900, filed Jul. 19, 2007.

(Continued)

*Primary Examiner* — Kiet Doan (57) ABSTRACT

A system is provided for mobile client-side location determination. The system includes a mobile device, which includes base transceiver station location data, a memory, a processor, and a location engine stored in the memory. When executed by the processor, the location engine receives information that identifies multiple base transceiver stations. The location engine also reads a location for each of the base transceiver stations from the base transceiver station location data and calculates a location of the mobile device based on the location of each of the base transceiver stations. Additionally, the location engine provides the location of the mobile device in a defined portion of a communication transmitted by the mobile device.

18 Claims, 6 Drawing Sheets

U.S. PATENT DOCUMENTS

2008/0010114 A1 1/2008 Head
2008/0119206 A1 5/2008 Shalmon et al.
2008/0227467 A1 9/2008 Barnes et al.
2009/0280824 A1* 11/2009 Rautiainen ................. 455/456.1

OTHER PUBLICATIONS

Barnes, James D., et al., "Coupon Validation Using Radio Frequency Fingerprinting," U.S. Appl. No. 11/779,045, filed Jul. 17, 2007.

Oh, Dae-Sik, et al., et al., et al., "Mobile-Implemented Method and System for Performing a Handoff Based on Mobile Station Location," U.S. Appl. No. 10/784,612, filed Feb. 23, 2004.

Foreign Communication From a Related Counterpart Application—International Preliminary Report on Patentability, PCT/CN2008/054657, Sep. 24, 2008, 6 pages.

International Searching Authority, International Search Report and the Written Opinion of the International Searching Authority dated Jun. 5, 2008, International Application Serial No. PCT/US08/54657, international filing date Feb. 22, 2008.

Lightningcast, Inc., "Lightningcast Mobile Video Advertising Solution," May 2, 2005, 14 pgs.

Office Action dated Oct. 15, 2009, U.S. Appl. No. 11/686,179, filed Mar. 14, 2007, 19 pages.

Office Action dated Jan. 7, 2010, U.S. Appl. No. 11/779,045, filed Jul. 17, 2007, 23 pages.

Final Office Action dated Dec. 7, 2010, U.S. Appl. No. 11/686,179, filed Mar. 14, 2007.

Notice of Allowance dated Dec. 10, 2010; U.S. Appl. No. 11/779,900, filed Jul. 19, 2007.

Advisory Action dated Feb. 16, 2011, U.S. Appl. No. 11/686,179, filed Mar. 14, 2007.

Supplemental Notice of Allowance dated Feb. 17, 2011; U.S. Appl. No. 11/779,900, filed Jul. 19, 2007.

Final Office Action dated May 11, 2010, U.S. Appl. No. 11/686,179, filed Mar. 14, 2007, 23 pages.

Notice of Allowance dated May 9, 2011, U.S. Appl. No. 11/686,179, filed Mar. 14, 2007.

Examiner's Answer dated Mar. 3, 2011, U.S. Appl. No. 11/779,045, filed Jul. 17, 2007.

Office Action dated Jun. 25, 2010, U.S. Appl. No. 11/779,900, filed Jul. 19, 2007, 22 pages.

Final Office Action dated Jul. 8, 2010, U.S. Appl. No. 11/779,045, filed Jul. 17, 2007, 30 pages.

Final Office Action dated Aug. 12, 2010, U.S. Appl. No. 11/686,179, filed Mar. 14, 2007, 23 pages.

Advisory Action dated Oct. 5, 2010, U.S. Appl. No. 11/779,045, filed Jul. 17, 2007.

* cited by examiner

SYSTEM AND METHOD FOR MOBILE DEVICE SELF-LOCATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices include applications, such as web browsers, that can request content from content providers, such as website servers. Such content providers may wish to provide customized content to a mobile device based on the geographic location of the mobile device. For example, an advertisement provider may wish to provide a football-related advertisement to mobile device users attending a football game played in a football stadium.

SUMMARY

In some embodiments, a system is provided for mobile client-side location determination. The system includes a mobile device, which includes base transceiver station (BTS) location data, a memory, a processor, and a location engine stored in the memory. When executed by the processor, the location engine receives information that identifies multiple BTSs. The location engine also reads a location for each of the BTSs from the BTS location data and calculates a location of the mobile device based on the location of each of the BTSs. Additionally, the location engine provides the location of the mobile device in a defined portion of a communication transmitted by the mobile device.

In some embodiments, a computer implemented method is provided for mobile client-side location determination. A mobile device receives information that identifies multiple BTSs. Multiple nearby BTSs are determined based on an amplitude of a corresponding signal for each of the BTSs. A location for each of the nearby BTSs is read from BTS location data stored on the mobile device. A location of the mobile device is calculated based on the location of each of the nearby BTSs. The location of the mobile device is provided in a header of a communication transmitted by the mobile device.

In some embodiments, a system is provided for mobile client-side location determination. The system includes a mobile device that includes BTS location data, a memory, a processor, and a location engine stored in the memory. When executed by the processor, the location engine receives information that identifies multiple BTSs, and determines multiple nearby BTSs based on an amplitude of a corresponding signal for each of the BTSs. The location engine also reads a location for each of the nearby BTSs from the BTS location data, and calculates a location of the mobile device based on the location of each of the nearby BTSs and a corresponding signal amplitude for each of the nearby BTSs. Additionally, the location engine provides the location of the mobile device in a header of a communication transmitted by the mobile device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

While information identifying the location of mobile devices may be useful for a variety of purposes, for example providing location based services and/or targeted advertising based on current location, content providers must overcome certain obstacles to provide customized content based on the geographic locations of mobile devices. For example, if a mobile phone user activates a web browser to request news content from a news website server, the website server may have a limited amount of time to provide customized content. The website server may not have time to request the mobile phone to identify the location of the mobile phone, to receive the identified location of the mobile phone, to process the received location of the mobile phone, to select customized content for a specific intended audience based on the processed location, and to convey this customized content to the mobile device. This timing problem can be addressed by requiring the mobile device to determine its own location in advance.

Although determining the location of a mobile device in advance can be helpful for providing customized content, accurately determining the location can require significant time and resources for the mobile device and the communication network for the mobile device. A mobile device may use a global positioning system (GPS) sensor to determine its location. However, initiating a GPS sensor on a mobile device when the GPS sensor is not already active may require a minute or more, which may be too long for an advertisement provider to select an advertisement based on the location of the mobile device and return the selected advertisement with the content requested by the mobile device. Keeping the GPS sensor constantly active to provide the location of the mobile device on the few occasions when the mobile device requests content may quickly drain the limited battery life on the mobile device. Furthermore, the GPS sensor may not function when the mobile device is indoors because the GPS sensor needs to be outdoors with a clear view of the sky.

A mobile device may assist in determining its location by detecting nearby base transceiver stations (BTSs) and reporting a list of the nearby BTSs to the mobile device's communication network. However, this location determination may require a significant amount of time because the mobile device communicates the list of the nearby BTSs, but not the location of the mobile device, to the network, which means that the network still has to take time to calculate the location of the mobile device. Furthermore, this location calculation may require significant consumption of network resources, such as processor capacity and time.

The present disclosure provides systems and methods for mobile client-side location determination. A mobile device includes BTS location data and a location engine. The location engine receives information that identifies multiple BTSs, for example BTS identification information transmitted on pilot signals by the BTSs. The location engine also reads a location for each of the nearby BTSs from the BTS location data. The BTS location data specifies the location of each BTS and may further define one or more of the shape, the size, and the orientation of each BTS coverage sector. The location engine calculates a location of the mobile device based on the location of each of the BTSs. For example, when all of the BTS coverage sectors are overlaid on a map, the location engine may determine that the mobile device is in the area where most of the BTS coverage sectors overlap. In one example, if the location engine identifies the signals from only two BTSs, the location engine may calculate that the location of the mobile device is between the two BTSs, at a point where the location engine may not detect a signal from any other BTSs.

In an embodiment, the location engine provides the location of the mobile device in a defined portion, such as a header, of a communication transmitted by the mobile device. Providing the location in every communication may enable content providers to quickly return content that is based on the location of the mobile device without the consumption of significant resources by the communication network or the mobile device battery. The location engine may also provide the location in only some communications, such as specified types of communications, periodic communications, and communications in response to specific events.

The BTS location data stored by the mobile device may be limited to information for BTSs within a metropolitan area, but the BTS location data may be updated on the mobile device whenever the mobile device approaches the geographical limit of the BTS location data. For example, the BTS location data may contain information for the BTSs in a metropolitan area, and the mobile device may be transmitting communication headers that indicate that the mobile device is moving towards the northernmost of the BTSs in the metropolitan area. In this situation, the mobile device may receive an update that includes location information for the BTSs that are located north of the metropolitan area. In an embodiment, the client-side location determination may determine the location of the mobile device faster than other self-location determination methods. Furthermore, because the mobile device includes the client-side location determination in communications, the website server does not have to request the location of the mobile device and wait to receive the location from either the mobile device or the telecommunication provider.

Figure 1:
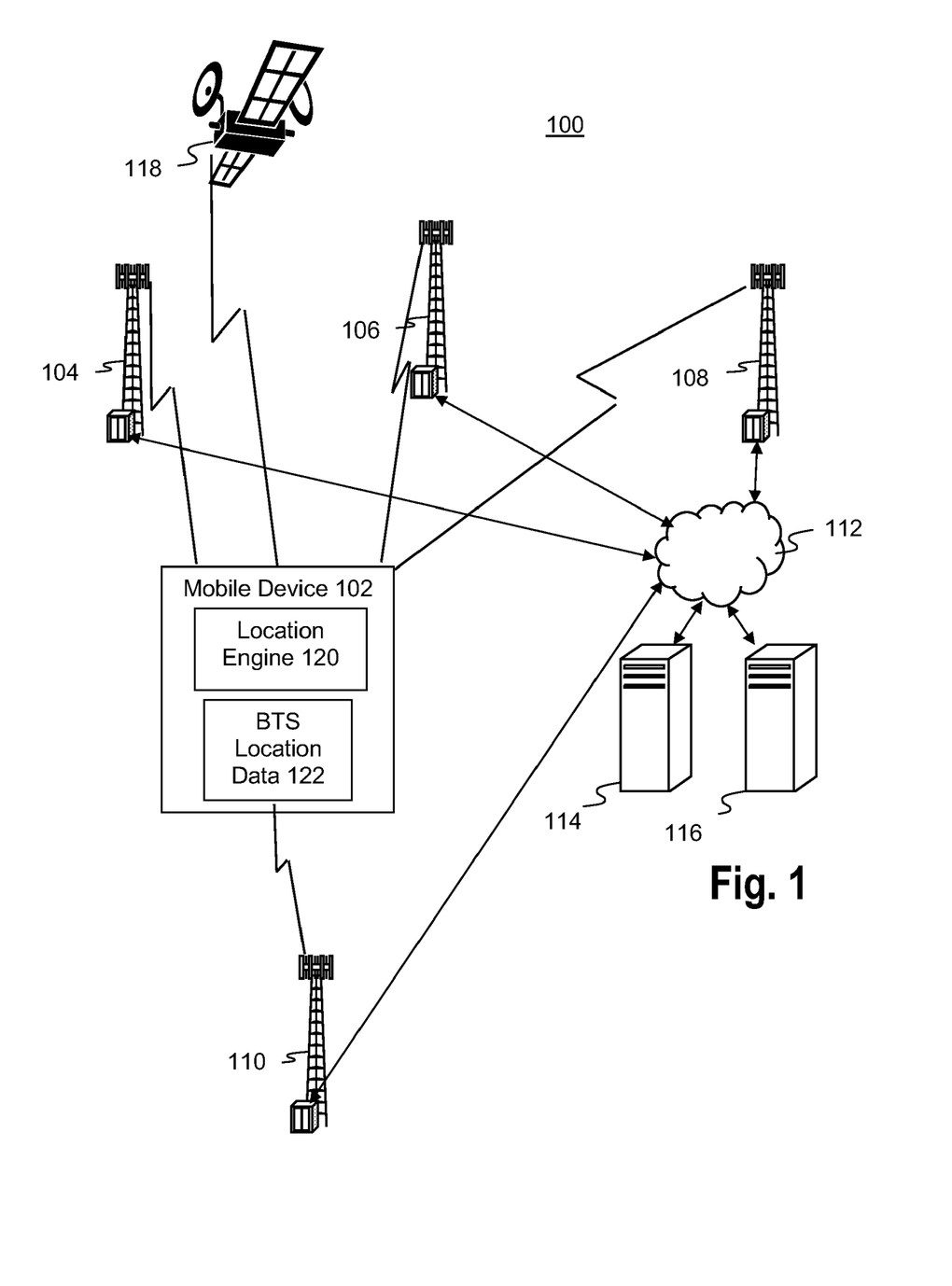
FIG. 1 shows an illustrative wireless communications system for mobile client-side location determination according to some embodiments of the present disclosure.

FIG. 1 shows a wireless communications system 100 according to an embodiment of the present disclosure. The wireless communication system 100 includes a mobile device 102, a first BTS 104, a second BTS 106, a third BTS 108, a fourth BTS 110, a network 112, a server 114, an advertisement server 116, and a global positioning satellite 118. While four BTSs 104-110 are shown in FIG. 1, other BTSs could be present.

The mobile device 102 may communicate through the first BTS 104, the second BTS 106, the third BTS 108, or the fourth BTS 110 and through the network 112 to access information on various servers, such as the server 114 and the advertisement server 116. The server 114 may provide content that may be presented on the mobile device 102. The advertisement server 116 may provide advertisements for the mobile device 102. While one server 114 and one advertisement server 116 are shown in FIG. 1, other servers could be present. Although the server 114 and the advertisement server 116 are depicted separately in FIG. 1, the functions of the server 114 and the functions of the advertisement server 116 may be combined on one server.

The server 114 and the advertisement server 116 communicate with the mobile device 102 through the network 112 and the first BTS 104, the second BTS 106, the third BTS 108, or the fourth BTS 110 by a standard wireless telephony protocol, a wireless internet connection, or some other means of wireless communication. Examples of standard wireless telephony protocol include an integrated digital enhanced network (IDEN) communication technology, a code division multiple access (CDMA) technology, a global system for mobile communication (GSM) technology, a universal mobile telecommunications system (UMTS) technology, a long-term evolution (LTE) technology, a worldwide interoperability for microwave access (WiMAX) technology, and other air interface protocol technology.

The mobile device 102 may be a mobile phone, a telephone, a wireless communication device, a pager, a personal digital assistant, a portable computer, a tablet computer, a laptop computer, a digital camera, a digital music player, a digital calculator, an electronic key fob for keyless entry, a media player, or an inventory control device. The mobile device 102 includes a location engine 120 and BTS location data 122. The BTS location data 122 may be associated with a metropolitan area and may include BTS geographic location, BTS sector coverage radius, BTS antenna azimuth, BTS antenna tilt, and/or BTS antenna rotation. For example, the BTS location data 122 includes data associated with BTS identifiers, BTS geographic location, BTS sector coverage radius, BTS antenna azimuth, BTS antenna tilt, and/or BTS antenna rotation for BTSs in the Los Angles area. The BTS geographic location may be based on longitude and latitude or a postal code. In an embodiment, the server 114 may transmit the BTS location data 122 to the mobile device 102 within ten seconds of the mobile device 102 registering with the network 112. For example, after the user of the mobile device 102 flies from New York to Los Angles and turns the mobile device 102 back on, the server 114 transmits the BTS location data 122 to the mobile device 102, where the BTS location data 122 includes data associated with BTS identifiers, BTS geographic location, BTS sector coverage radius, BTS antenna azimuth, BTS antenna tilt, and/or BTS antenna rotation for BTSs in the Los Angles area.

The location engine 120 receives BTS identifiers broadcast by the BTSs 104-110 that identifies the BTSs 104-110. The location engine 120 may receive a BTS identifier from a serving BTS, such as the first BTS 104, which the location engine may use to determine the longitude and the latitude of the serving BTS from the BTS location data 122, and BTS identifiers from additional BTSs, such as the BTSs 106-110, which the location engine may use to determine the longitude and the latitude of the additional BTSs form the BTS location data 122. The location engine 120 reads a location for each of the BTSs 104-110 from the BTS location data 122. For example, the BTS location data 122 specifies the location of each of the BTSs 104-110 and may further specify one or more of the shape, the size, and the orientation of each BTS coverage sector. The location engine 120 calculates a location of the mobile device 120 based on the location of each of the BTSs 104-110. For example, when all of the BTS coverage sectors are overlaid on a map, the location engine 120 may determine that the mobile device 120 is in the area where most of the BTS coverage sectors overlap. In one example, if the location engine 120 identifies the signals from only the BTSs 104 and 106, the location engine 120 may calculate that the location of the mobile device 102 is between the BTSs 104 and 106 at a point where the location engine 120 may not detect a signal from any of the other BTSs 108 and 110. In some embodiments, when available, the shape, the size, and/or the orientation of each BTS coverage sector may also be employed to further refine the determination of the location of the mobile device 102.

In some embodiments, the location engine 120 may determine multiple nearby BTSs based on a strength or an amplitude of a corresponding signal for each of the BTSs 104-110. In telecommunications, particularly in radio, signal strength or signal amplitude may refer to the magnitude of the electric field at a reference point that is a significant distance from the transmitting antenna. Signal amplitude may also be referred to as received signal level or field strength. For example, the location engine 120 determines that the signal amplitude from two nearby BTSs 104 and 106 is strong, but the signal amplitude from two other nearby BTSs 108 and 110 is weak. If the signal amplitude from two nearby BTSs 108 and 110 is weak, the location engine 120 may not use the BTSs 108 and 110 to determine the location of the mobile device 102 because the data from the BTSs 108 and 110 is less useful, which would tend to worsen the accuracy of the location determination. Therefore, the location engine 120 reads a location for each of the nearby BTSs 104 and 106 from the BTS location data 122.

The location engine 120 may calculate the location of the mobile device 102 based on the location of each of the nearby BTSs 104-110 and a corresponding signal amplitude for each of the nearby BTSs 104-110. For example, if the location engine 120 determines that the signal amplitude is strong from only the two BTSs 104 and 106, the location engine 120 may calculate that the mobile device 102 is between the two BTSs 104 and 106 at a location where the mobile device 102 may not detect a strong signal from any of the other BTSs 108 and 110. In this example, the location engine 120 may calculate the location of the mobile device 102 as latitude 42 degrees 25 minutes 15 seconds north and longitude 83 degrees 1 minute 45 seconds west based on the latitude and longitude data stored in the BTS location data 122 for the BTSs 104 and 106. The latitude and the longitude calculation of the location may be accurate within a couple hundred meters of the mobile device's location, producing a location calculation that is much more accurate than the location inferred by a BTS sector, which may be accurate only within more than a thousand meters.

When the mobile device 102 is indoors, the signal amplitudes from the BTSs 104-110 may be diminished, which may make it appear that the mobile device 102 is further away from the BTSs 104-110 than the mobile device 102 is actually away from the BTSs 104-110. However, if the mobile device 102 is outdoors, the location engine 120 may use the signal amplitudes from the BTSs 104-110 not just for separating the BTSs 104-110 into those with strong signals and those with weak signals, but as the basis for approximating the distance to the BTSs 104-110 as inversely related to their signal amplitudes. For example, the location engine 120 may determine that the signal amplitude from the first BTS 104 is 55 dB-microvolts per meter, the signal amplitude from the second BTS 106 is 45 dB-microvolts per meter, and the signal amplitude from the third BTS 108 is 5 dB-microvolts per meter. In this example, the location engine 120 may calculate that the mobile device 102 is located approximately on a line between the BTSs 104 and 106 with the signal amplitudes of 55 dB-microvolts and 45 dB-microvolts. The location engine 120 may calculate that the mobile device 102 is on the line between the BTSs 104 and 106 at a point that is approximately 45% of the way from the first BTS 104 with the signal amplitude of 55 dB-microvolts to the second BTS 106 with the signal amplitude of 45 dB-microvolts. Using the BTSs' signal amplitudes, and other adjustments such as BTS antenna tilt, and/or BTS antenna rotation, to calculate the location of the mobile device 102 may result in calculating the location even more accurately. For example, if the BTS location data 122 indicates that the BTS antenna tilt for the second BTS 106 is 10% more downward than normal, then the expected amplitude of the signal from the second BTS 106 may be 10% less than normal, which means that the mobile device 102 may be 10% closer to the second BTS 106 than indicated by the signal amplitude of the second BTS 106.

The location engine 120 may calculate the location of the mobile device 102 using an adjustment for a communication condition based on a subscriber demand, a sports event, an artistic performance, a time of the day, a day of the week, a school schedule, a holiday, a weather condition, a season of the year, and/or a tourist period. For example, wireless shadowing conditions may be different during summer months when deciduous trees are in full leaf than during winter months when the leaves of deciduous trees have dropped, and the expected signal amplitude for the BTSs 104-110 may be adjusted based on the foliage conditions in some service areas. In another example, different regions may experience distinctive seasonal precipitation patterns affecting wireless radio propagation, and the expected signal amplitude for the BTSs 104-110 may be adjusted based on the seasonal precipitation patterns in some service areas. In yet another example, if the first BTS 104 serves a university or high school campus, offered traffic demands may vary according to the university or high school schedule, and the expected signal amplitude for the BTS 104 may be adjusted based on those known schedules.

If the BTS 104 serves a professional sports venue, for example a professional football stadium, offered traffic demands may vary according to the home team game schedule, and the expected signal amplitude for the BTS 104 may be adjusted based on the known home game schedule. If the BTS 104 serves a tourist area, for example a ski resort, offered traffic demands may vary according to a schedule of the ski resort, and the expected signal amplitude for the BTS 104 may be adjusted based on the known ski resort schedule. Each adjustment for expected signal amplitude may result in more accurate calculations of the location of the mobile device 102. The mobile device 102 may receive updates for the BTS location data 122 based on these communication conditions.

In an embodiment, the location engine 120 may provide the location of the mobile device 102 in a defined portion, such as a header, of a communication transmitted by the mobile device 102. In another embodiment, however, the location engine 120 may provide the location of the mobile device 102 in a different portion of the communication transmitted by the mobile device 102, for example embedded in a body portion or a footer portion of the communication.

Providing the location in every communication may enable content providers to quickly return content that is based on the location of the mobile device 102 without the consumption of significant resources by the network 112 or the battery for the mobile device 102. The location engine 120 may also provide the location in only some communications, such as specified types of communications, periodic communications, and communications in response to specific events. For example, the location engine 120 may provide the location in a communication of the mobile device 102 in response to a lapse of a duration of time, a use of an application on the mobile device 102, a call on the mobile device 102, and/or an enablement of a global positioning system (GPS) sensor. The location engine 120 may provide the location in a communication of the mobile device 102 based on a duration of time, such as on a per-minute basis. If the location engine 120 determines that the location of the mobile device 102 has changed since the last location determination, the location engine 120 may shorten the duration of time until the next provision of the location in a communication. Similarly, if the location engine 120 determines that the location of the mobile device 102 has not changed since the last location determination, the location engine 120 may lengthen the duration of time until the next provision of location in a communication.

If the user of the mobile device 102 activates a browser application, the location engine 120 may provide the location of the mobile device 102 in a communication because the advertisement server 116 may provide different advertisements in response to requests from the browser application based on the location of the mobile device 102. If the user makes a call on the mobile device 102, the location engine 120 may provide the location of the mobile device 102 because the most recent provided location of the mobile device 102 may not have been provided very recently. The location engine 120 may provide the location of the mobile device 102 in a communication based on enablement of the GPS sensor, such as when the mobile device 102 is taken from indoors to outdoors. The mobile device 102 can periodically check for GPS enablement based on the passage of time. In an embodiment, the location engine 120 may determine the location of the mobile device 102 in less than one second, in contrast to the more than 60 seconds that may be required to initiate a GPS sensor to determine the location of the mobile device 102.

The advertisement server 116 may use the location of the mobile device 102 to select an advertisement for the mobile device 102, and provide the selected advertisement for the mobile device 102. For example, if the mobile device 102 includes its location in the header of a web browser request for content, the advertisement server 116 may determine that the location corresponds to a football stadium, select a football-related advertisement, and enable the server 114 to provide the football-related advertisement with the requested content to the mobile device 102. The advertisement server 116 may evaluate an effectiveness of the selected advertisement based on subsequent locations of the mobile device 102. For example, if the selected advertisement sent to the mobile device 102 is for a restaurant, the advertisement server 116 may monitor subsequent location calculations transmitted from the mobile device 102 to determine if the mobile device 102 subsequently entered the advertised restaurant. Such quick, inexpensive, and frequent transmissions of location may enable advertisers to more accurately evaluate the effectiveness of transmitted advertisements, thereby leading to the increased usage of advertisements that are proven to be effective and the replacement of advertisements that do not appear to be as effective. Previous advertisement evaluations of this nature may have been difficult because the limited accuracy of location determinations may not have enabled the advertisement provider to determine whether the mobile device 102 was subsequently at the precise location associated with an advertisement. Previous advertisement evaluations of this nature may have also consumed too many resources of the network 112 and/or the mobile device battery to have been conducted.

The location engine 120 may display locations of other mobile devices 102 on a map based on a social network application. For example, the mobile device user may activate a web browser to access a social network application to view a map of the current location of the user's friends. The mobile device 102 may display the map that includes the locations of the friends mobile devices 102 that were calculated by the friends' mobile devices 102. The location of mobile devices 102 may also be used as the basis for monitoring employees during working hours using their mobile phones 102 or tracking prisoners with the mobile device 102 that is used as a tracking device.

The location engine 120 may determine the location of the mobile device 102 in response to a lapse of a duration of time, a use of an application on the mobile device 102, a call on the mobile device 102, and/or an enablement of a GPS sensor. The location engine 120 may determine the location of the mobile device 102 based on a duration of time, such as on a per-minute basis. If the location engine 120 determines that the location of the mobile device 102 has changed since the last location determination, the location engine 120 may shorten the duration of time until the next determination of location. Similarly, if the location engine 120 determines that the location of the mobile device 102 has not changed since the last location determination, the location engine 120 may lengthen the duration of time until the next determination of location. If the user of the mobile device 102 activates an application, the location engine 120 may determine the location of the mobile device 102 because the most recent location calculation may not have been calculated very recently. If the user makes a call on the mobile device 102, the location engine 120 may determine the location of the mobile device 102 because the most recent calculated location of the mobile device 102 may not have been calculated very recently. The location engine 120 may determine the location of the mobile device 102 based an enablement of the GPS sensor, such as when the mobile device 102 is taken from indoors to outdoors. The mobile device 102 can periodically check for GPS enablement based on the passage of time.

The server 114 may transmit an update for the BTS location data 122 to the mobile device 102 in response to a determination that the mobile device 102 is approaching a geographical limit associated with the BTS location data 122. For example, if the BTS location data 122 contains information for the BTSs in the Los Angles area, and the mobile device 102 is transmitting communication headers that indicate that the mobile device 102 is moving towards the northernmost of the BTSs in the Los Angles area, the server 114 transmits an update within ten seconds that includes information for the BTSs that are located north of the Los Angeles area. The update adds additional BTS location data to the BTS location data 122 and/or replaces a portion of the BTS location data 122. For example, the updated information for the BTSs to the north of Los Angeles may be added to the BTS location data 122 or replace part of the BTS location data 122. The portion of the BTS location data 122 that may be replaced can be based on a direction opposite to a direction associated with the geographical limit associated with the BTS location data 122. For example, the updated information for the BTSs to the north of Los Angeles may replace the part of the BTS location data 122 that stores the information for the BTSs in the southernmost part of the Los Angeles area.

The location engine 120 may maintain a history of the location of the mobile device 102 and a time associated with a determination of the location of the mobile device 102. The signal amplitude from the BTSs 104-110 may be highly variable due to the amount of communication traffic and the time of the day, such that the location engine 120 may calculate slightly different locations of the mobile device 102 over time even when the mobile device 102 is completely stationary. The BTS that is closest to the mobile device 102 may become very busy, and contract the BTS signal amplitude accordingly. The location engine 120 may recalculate the location of the mobile device 102 based on the history. For example, the location engine 120 may average a number of very similar locations stored over a period of time, such as from 1:00 to 5:00 in the afternoon on a weekday, to calculate a more accurate location for where the mobile device user may work. The amount of information that can be stored for historic determinations of locations for the mobile device 102 may depend upon the memory available for the mobile device 102.

The location engine 120 may provide a request to the mobile device 102 to tag the location of the mobile device 102, receive a tag of the location of the mobile device 102, and provide the tag of the location of the mobile device 102 to a database upon which the BTS location data 122 is based. For example, the mobile device 102 may prompt a user to submit a label or tag for their current location when the user activates a navigation application. The location engine 120 may use the user-provided tag of the location for subsequent uses of the navigation application, and also use the tag of the location for other purposes. For example, if the user tags the location of their mobile device 102 as at an automobile dealership, the advertisement server 116 may use this tag to select advertisements for rival automobile dealerships when subsequent requests for content are received from mobile devices 102 at the location that is tagged as an automobile dealership. Tagging locations may enable advertisers to provide more targeted advertisements.

The location engine 120 may estimate a location of an out-of-network BTS based on executing a location fix technology and provide the location of the out-of-network BTS for the BTS location data 122. For example, the mobile device may receive a signal of 50 dB-microvolts per meter from each of the BTSs 104-110, but the fourth BTS 110 may not be in the BTS location data 122 because the fourth BTS 110 is operated by another communication network service provider. In this situation, the location engine 120 may execute a location fix technology to determine the location of the mobile device 102 and use the location of the mobile device 102 and the other BTSs 104-108 to calculate the location of the fourth BTS 110. The location engine 120 may calculate the location of the fourth BTS 110, and the mobile device 102 may communicate the location of the fourth BTS 110 to the server 114, which may use the location of the fourth BTS 110 to update the BTS location data 122 for each mobile device that is within the metropolitan area where the fourth BTS 110 is located. The location fix technology may be a GPS technology, an advanced forward link trilateration, and/or a hybrid location fix technology.

The mobile device 102 may track the global positioning satellite 118. Global positioning satellites 118 transmit signals that are received by the mobile device 102. The mobile device 102 triangulates its position based on the different signals received from different global positioning satellites 118. The location accuracy is environment driven and dependant on the type of equipment used. The GPS technology is owned and operated by the U.S. Department of Defense, but is available for general use around the world. The GPS technology requires a direct line of sight between the mobile device 102 and four or more satellites to fix the location of the mobile device, such as when the mobile device is outdoors. Although the GPS technology provides high accuracy location fixes, this self-location technology may require a significant amount of time to execute when initiated and often cannot provide location fixes for mobile devices 102 that are indoors. Because of the time and the battery power required to measure signals from multiple satellites and to triangulate the location fix, the mobile device 102 executes the GPS technology in the background infrequently for the periodic determinations of the location of out-of-network BTSs.

Furthermore, the mobile device 102 may use advanced forward link trilateration technology to determine its position based on the different radio frequency signals received from different BTSs, such as the BTSs 104-110. Each serving BTS broadcasts a system parameters information message to the mobile device 102. The radius covered by serving BTSs vary greatly, from hundreds of meters in dense urban areas to 20 miles or more in rural environments.

The advanced forward link trilateration technology fixes the location of the mobile device 102 based on measurements taken of time and distance signals from nearby BTSs. The mobile device 102 reports the time and distance measurements to the network 112, then the network 112 triangulates a location fix of the mobile device 102, and reports the location fix back to mobile device 102. In general, more than three surrounding BTSs are required to triangulate an optimal location fix. Because of the time required to measure signals from multiple BTSs, to report the measurements to the network 112, to triangulate the location fix, and to report the location fix back to the mobile device 102, the advanced forward link trilateration technology requires significant amounts of both time and resources from the mobile device 102 and the network 112. Therefore, although the advanced forward link trilateration technology determines high accuracy location fixes, the mobile device 102 executes the advanced forward link trilateration technology in the background infrequently for the periodic determinations of the location of out-of-network BTSs.

The mobile device 102 may use a hybrid technology to fix the location of the mobile device 102 based on a combination of other location fix technologies. For example, if the mobile device 102 is indoors, but close to a window, the GPS technology in combination with the advanced forward link trilateration technology can calculate the location fix for the mobile device 102. When the mobile device 102 is indoors, the mobile device 102 may receive signals from an insufficient number of satellites to triangulate the position of the mobile device 102. However, the hybrid technology can combine the signals from the insufficient number of satellites with the BTS location identified by the advanced forward link trilateration technology to calculate a hybrid location fix for the mobile device 102. Due to the time and the resources consumed, the mobile device 102 executes the hybrid technology in the background infrequently for the periodic determinations of the location of out-of-network BTSs.

The mobile device 102 may log and store higher cost data, such as a GPS-determined location, and use the higher cost data for a period of time, or in response to a request, before returning to use base level data, such as a client-side location determination. As used herein, the term 'higher cost' may refer to a higher amount of battery energy consumed, an increased burden of processor resources, an increased amount of memory utilization, and/or a greater consumption of network resources and 'lower cost' and or 'cheaper' may refer to a lesser amount of battery energy consumed, a decreased burden of process resources, a decreased amount of memory utilization, and/or a reduced consumption of network resources. Although the client-side location determination may be less accurate than the GPS-determined location, the client-side location determination may be faster and cheaper on the mobile device battery and on network resources. Therefore, the client-side location determination may be included in most or all communications. The mobile device 102 may optionally use the higher cost data when the higher cost data is available.

Figure 2:
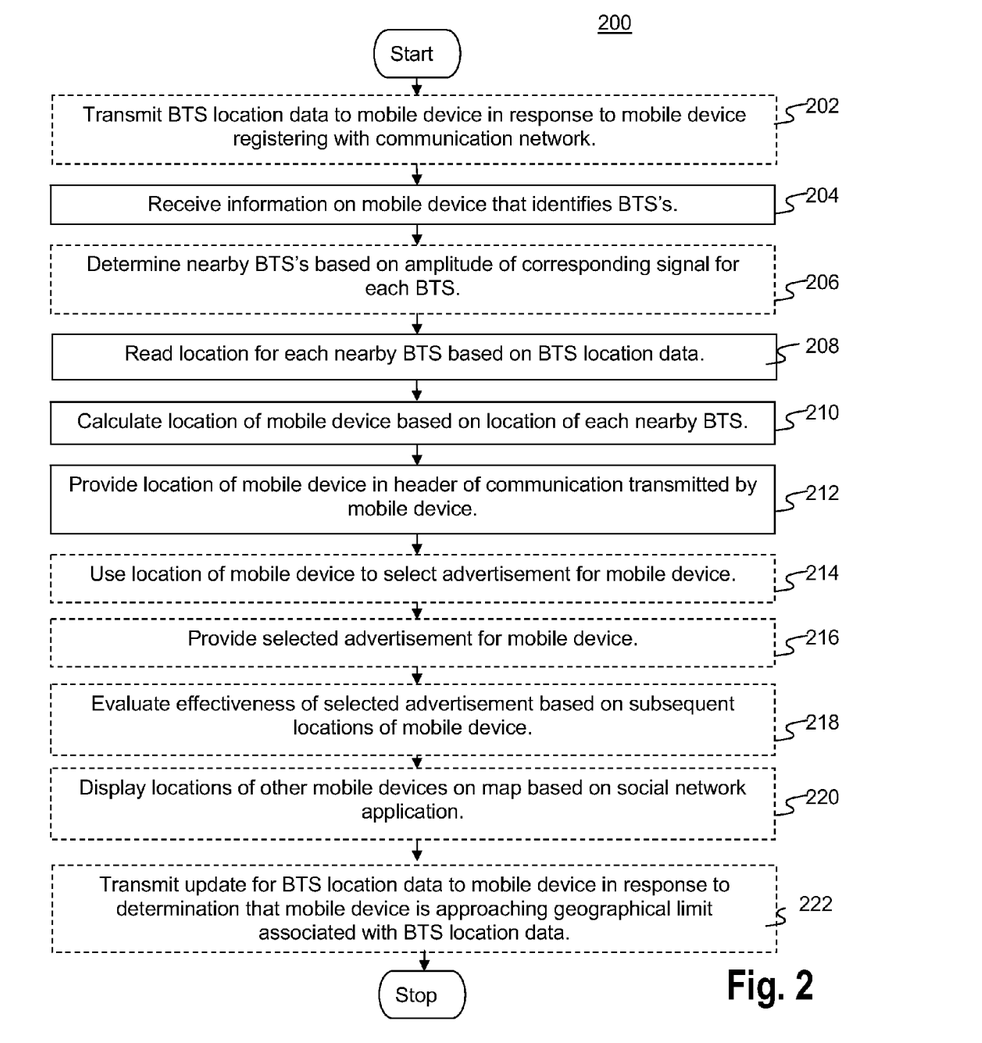
FIG. 2 shows a flowchart of a method for mobile client-side location determination according to some embodiments of the present disclosure.

FIG. 2 is a flowchart illustrating a method 200 for mobile client-side location determination according to some embodiments of the present disclosure. The mobile device 102 can use the method 200 to calculate the location of the mobile device 102 and avoid unnecessary executions of location fix technologies.

In box 202, BTS location data is optionally transmitted to a mobile device in response to the mobile device registering with a communication network. For example, after the mobile device 102 is turned on to register with the network 112 upon arrival in Los Angeles, the server 114 transmits the BTS location data 122 for Los Angles to the mobile device 102.

In box 204, information is received on a mobile device that identifies BTSs. For example, the location engine 120 receives information that identifies the BTSs 104-108 in Los Angeles.

In box 206, nearby BTSs are optionally determined based on an amplitude of a corresponding signal for each BTS. For example, the location engine 120 determines the BTSs 104 and 106 are nearby and that the BTSs 108 and 110 are not as close based on strong signals received from the BTSs 104 and 106 and weak signals received from the BTSs 108 and 110.

In box 208, a location is read for each nearby BTS based on BTS location data. For example, the location engine 120 reads a location for each of the nearby BTSs 104 and 106 from the BTS location data 122.

In box 210, the location of a mobile device is calculated based on the location of each nearby BTS. For example, the location engine 120 calculates the location of the mobile device 102 as latitude 42 degrees 25 minutes 15 seconds north and longitude 83 degrees 1 minute 45 seconds west based on the latitude and longitude of each of the nearby BTSs 104 and 106 listed in the BTS location data 122.

In box 212, the location of a mobile device is provided in a defined portion of a communication transmitted by the mobile device. For example, the location engine 120 provides the location of the mobile device 102 as latitude 42 degrees 25 minutes 15 seconds north and longitude 83 degrees 1 minute 45 seconds west in a header of a web browser request for content transmitted by the mobile device 102. In an embodiment, the location of the mobile device 102 may be provided in a header portion of a message transmitted by the mobile device 102. Alternatively, the location of the mobile device 102 may be provided in a data field, a parameter, and/or an information element of the body of a message transmitted by the mobile device 102.

In box 214, the location of a mobile device is optionally used to select an advertisement for the mobile device. For example, the advertisement server 116 uses the location of latitude 42 degrees 25 minutes 15 seconds north and longitude 83 degrees 1 minute 45 seconds west to select an advertisement for a restaurant nearby the mobile device 102.

In box 216, a selected advertisement is optionally provided for a mobile device. For example, the advertisement server 116 provides the selected restaurant advertisement for the mobile device 102 to the server 114, which communicates the content and the restaurant advertisement to the mobile device 102.

In box 218, the effectiveness of a selected advertisement is optionally evaluated based on subsequent locations of a mobile device. For example, the advertisement server 116 determines that the mobile device 102 was at the location of the restaurant that sponsored the restaurant advertisement subsequent to receiving the restaurant advertisement.

In box 220, locations of other mobile devices are optionally displayed on map based on a social network application. For example, the location engine 120 displays a map of the locations of the mobile devices 102 for the user's friends in a social network application.

In box 222, an update for BTS location data is optionally transmitted to a mobile device in response to a determination that the mobile device is approaching a geographical limit associated with the BTS location data. For example, when the mobile device 102 is near the northernmost BTS in the Los Angles area, the server 114 transmits an update for the BTS location data 122 to the mobile device 102 that includes information for BTSs north of the Los Angeles area.

Figure 3:
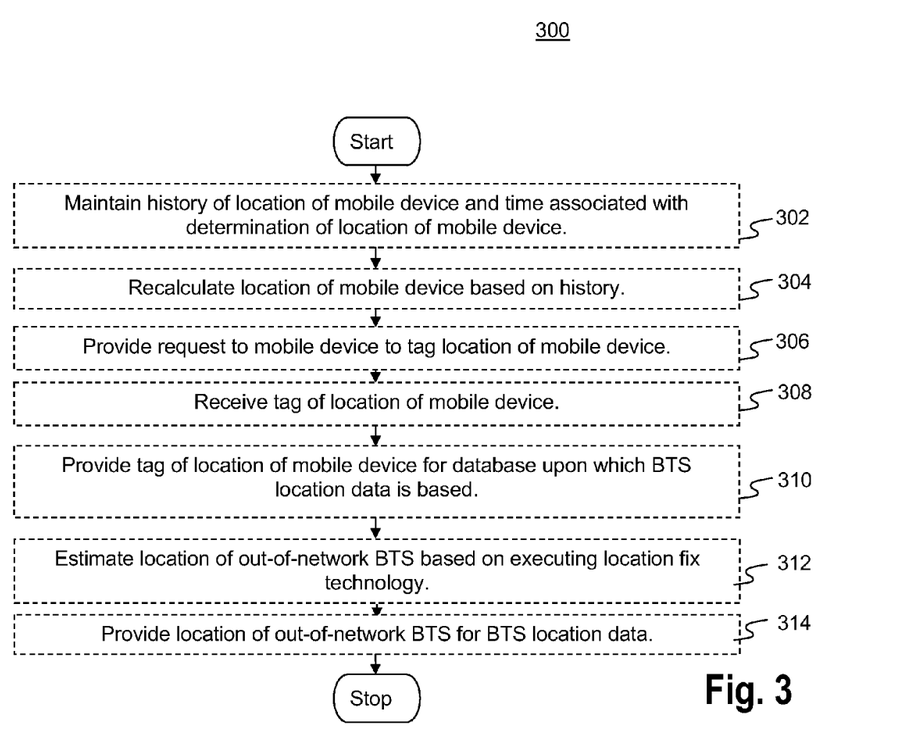
FIG. 3 shows a flowchart of another method for mobile client-side location determination according to some embodiments of the present disclosure.

FIG. 3 is a flowchart illustrating a method 300 for mobile client-side location determination according to some embodiments of the present disclosure. The mobile device 102 can use the method 300 to refine the calculations of the location of the mobile device 102 and avoid unnecessary executions of location fix technologies.

In box 302, the history of the location of a mobile device and the time associated with the determination of the location of the mobile device are optionally maintained. For example, the location engine 120 maintains a history of the locations of the mobile device 102 determined from 9:00 to 12:00 and 1:00 to 5:00 during weekdays.

In box 304, the location of a mobile device is optionally recalculated based on a history. For example, the location engine 120 recalculates the location of the mobile device 102 based on the history of locations determined for the mobile device 102 from 9:00 to 12:00 and 1:00 to 5:00 during weekdays.

In box 306, a request is optionally provided to a mobile device to tag the location of the mobile device. For example, the location engine 120 provides a request to the mobile device 102 to tag the location of the mobile device 102 when the user of the mobile device 102 activates a navigation application.

In box 308, a tag of the location of a mobile device is optionally received. For example, the location engine 120 receives the tag that identifies the location of the mobile device 102 as the user's workplace.

In box 310, a tag of the location of a mobile device is optionally provided to a database upon which BTS location data is based. For example, the location engine 120 provides the tag of the user's workplace as the location of the mobile device 102 in database upon which the BTS location data 122 is based.

In box 312, a location of an out-of-network BTS is optionally estimated based on executing a location fix technology. For example, the location engine 120 executes a GPS sensor to estimate the location of an out-of-network BTS.

In box 314, a location of an out-of-network BTS is optionally provided to BTS location data. For example, the location engine 120 provides the estimated location of the out-of-network BTS to the server 114 that updates the BTS location data 122.

Figure 4:
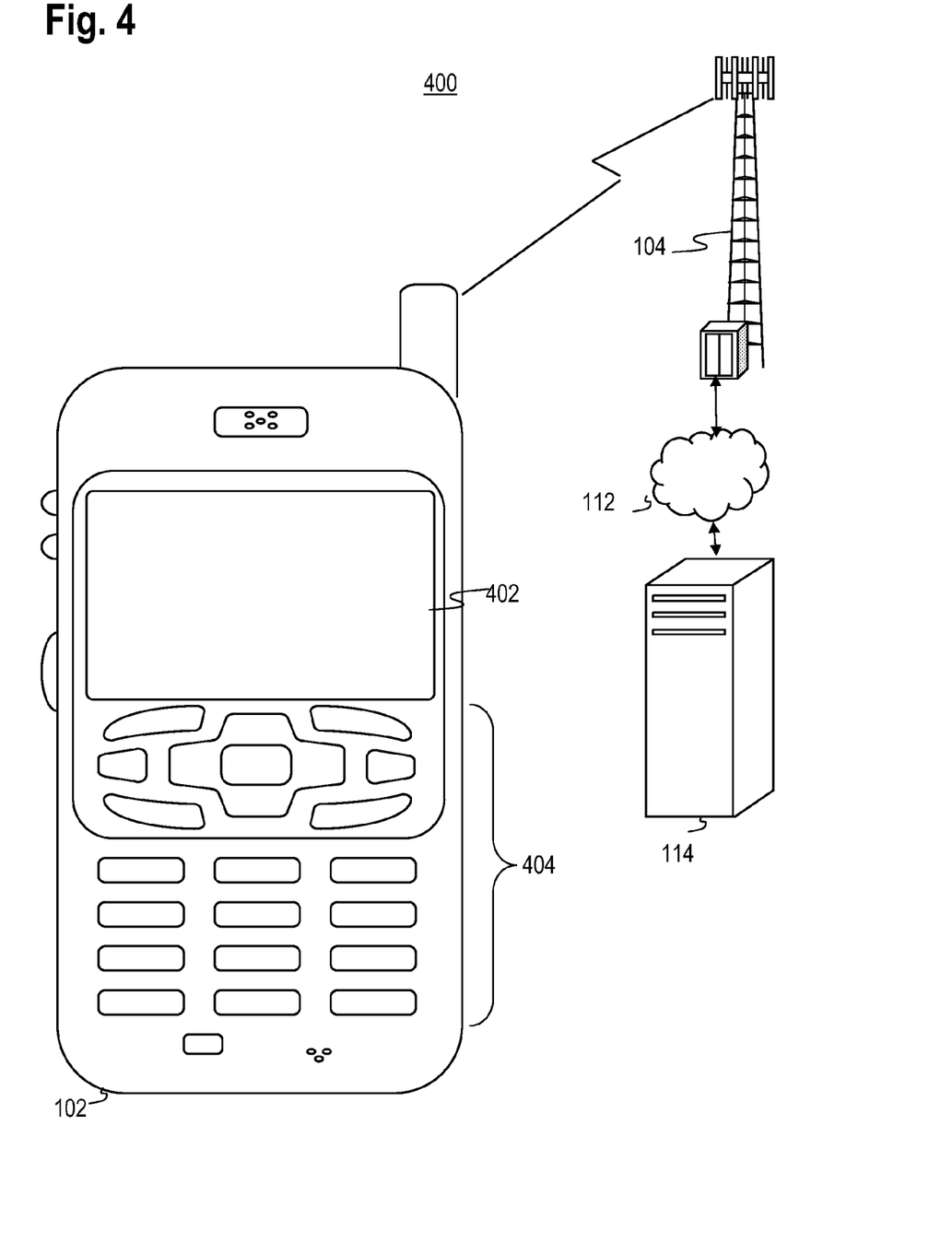
FIG. 4 shows an illustrative wireless communications system for an illustrative mobile device.

FIG. 4 shows a wireless communications system 400 including the mobile device 102. FIG. 4 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with the BTS 104 or the BTS 104, a wireless network access node, a peer mobile device 102 or any other wireless communication network or system. While a single BTS 104 is illustrated, it is understood that the wireless communication system may comprise additional base transceiver stations. In some instances, the mobile device 102 may be in communication with multiple BTSs 104 at the same time. The BTS 104 (or wireless network access node) is coupled to the network 112, such as the Internet. Via the wireless link and the wired network, the mobile device 102 has access to information on various servers, such as the server 114. The server 114 may provide content that may be shown on the display 402. Alternately, the mobile device 102 may access the BTS 104 through a peer mobile device 102 acting as an intermediary, in a relay type or hop type of connection.

Figure 5:
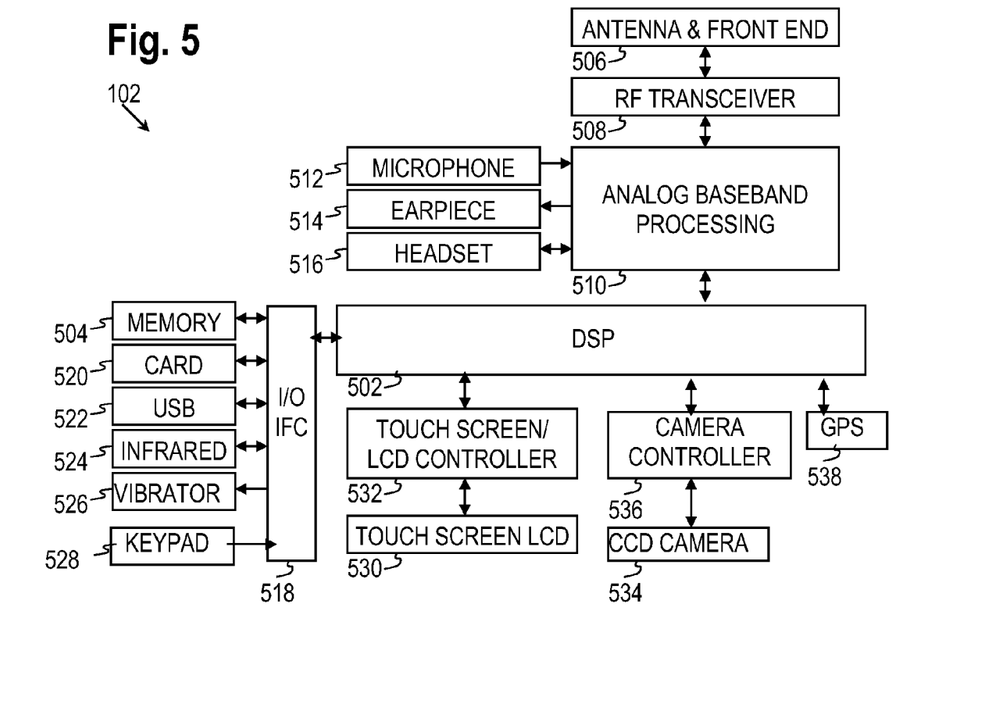
FIG. 5 shows a block diagram of an illustrative mobile device.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth® interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
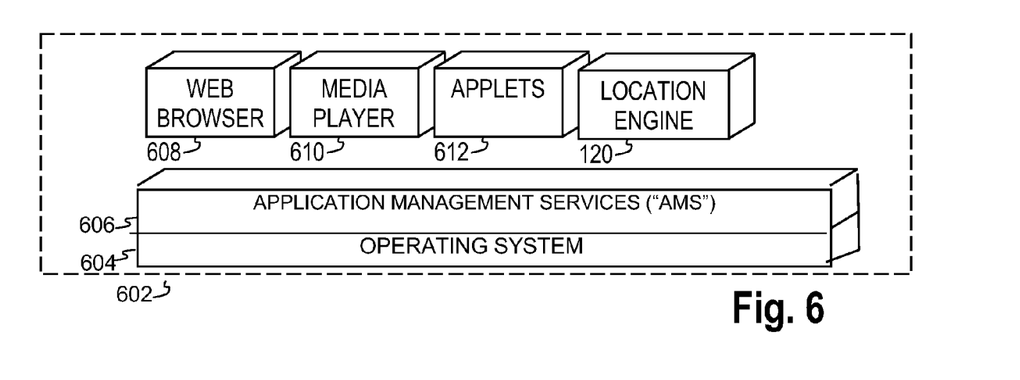
FIG. 6 shows a block diagram of an illustrative software configuration for a mobile device.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, JAVA applets 612, and the location engine 120. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
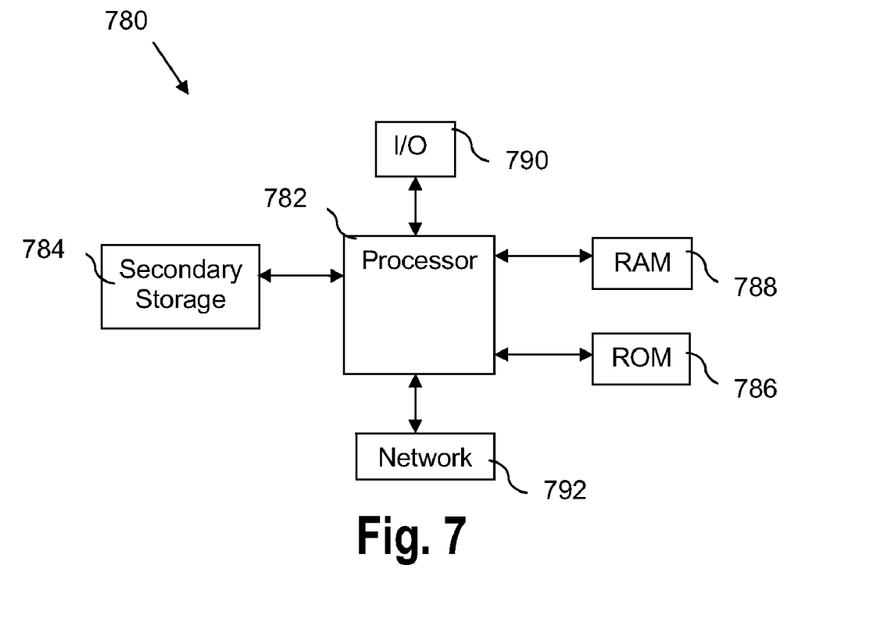
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for mobile client-side location determination, comprising:
    a mobile device comprising base transceiver station location data, a memory, a processor, and a location engine stored in the memory that, when executed by the processor:
    receives information that identifies a plurality of base transceiver stations,
    reads a location for each of the plurality of base transceiver stations from the base transceiver station location data,
    calculates a location of the mobile device based on the location of each of the plurality of base transceiver stations, wherein the location engine determines the location of the mobile device in less than one second in response to at least one of a lapse of a duration of time, a use of an application on the mobile device, a call on the mobile device, and an enablement of a global positioning system,
    provides the location of the mobile device in a defined portion of a communication transmitted by the mobile device,
    maintains a history of the location of the mobile device and a time associated with a determination of the location of the mobile device, and
    recalculates the location of the mobile device based on the history, wherein the location engine recalculates the location of the mobile device more frequently when the history indicates that the location has changed since a last location determination, and wherein the location engine recalculates the location of the mobile device less frequently when the history indicates that the location has not substantially changed since a last location determination.

2. The system of claim 1, wherein the mobile device is one of a mobile phone, a telephone, a wireless communication device, a pager, a personal digital assistant, a portable computer, a tablet computer, a laptop computer, a digital camera, a digital music player, a digital calculator, an electronic key fob for keyless entry, a media player, and an inventory control device.

3. The system of claim 1, wherein the plurality of base transceiver stations communicate with the mobile device via at least one of an integrated digital enhanced network (IDEN) communication technology, a code division multiple access (CDMA) technology, a global system for mobile communication (GSM) technology, a long-term evolution (LTE) technology, an universal mobile telecommunications system (UMTS) technology, and a worldwide interoperability for microwave access (WiMAX) technology.

4. The system of claim 1, wherein the defined portion of the communication comprises at least one of a header of the communication, a footer of the communication, and a body of the communication.

5. The system of claim 1, wherein recalculating the location of the mobile device is further based on an adjustment for a communication condition based on at least one of a subscriber demand, a sports event, an artistic performance, a time of the day, a day of the week, a school schedule, a holiday, a weather condition, a season of the year, and a tourist period.

6. A non-transitory computer implemented method for mobile client-side location determination, comprising:
    a mobile device receiving information that identifies a plurality of base transceiver stations in response to the mobile device registering with a communication network;
    determining a plurality of nearby base transceiver stations based on an amplitude of a corresponding signal for each of the plurality of base transceiver stations;
    reading a location for each of the plurality of nearby base transceiver stations from base transceiver station location data stored on the mobile device;
    calculating a location of the mobile device based on the location of each of the plurality of nearby base transceiver stations, wherein the location engine calculates the location of the mobile device in less than one second in response to at least one of a lapse of a duration of time, a use of an application on the mobile device, a call on the mobile device, and an enablement of a global positioning system;
    providing the location of the mobile device in a header of a communication transmitted by the mobile device;
    maintaining a history of the location of the mobile device and a time associated with a determination of the location of the mobile device, and
    recalculating the location of the mobile device based on the history, wherein the location engine recalculates the location of the mobile device more frequently when the history indicates that the location has changed since a last location determination, and wherein the location engine recalculates the location of the mobile device less frequently when the history indicates that the location has not substantially changed since a last location determination.

7. The non-transitory computer implemented method of claim 6, further comprising:
    estimating a location of an out-of-network base transceiver station based on executing a location fix technology, wherein the location fix technology comprises one of advanced forward link trilateration, global positioning system, and a hybrid location fix technology; and
    providing the location of the out-of-network base transceiver station for the base transceiver station information.

8. The non-transitory computer implemented method of claim 6, wherein providing the location of the mobile device comprises at least one of providing the location in each communication transmitted by the mobile device, providing the location in a specified type of communication transmitted by the mobile device, periodically providing the location in communications transmitted by the mobile device, and providing the location in communications transmitted by the mobile device in response to a specific event.

9. The non-transitory computer implemented method of claim 6, further comprising:
    providing a request to the mobile device to tag the location of the mobile device;

receiving a tag of the location of the mobile device; and
providing the tag of the location of the mobile device in a database upon which the base transceiver station location data is based.

10. The non-transitory computer implemented method of claim 6, further comprising transmitting an update for the base transceiver station location data to the mobile device in response to a determination that the mobile device is approaching a geographical limit associated with the base transceiver station information.

11. The non-transitory computer implemented method of claim 10, wherein the update one of adds additional base transceiver station location data to the base transceiver station location data and replaces a portion of the base transceiver station location data.

12. The non-transitory computer implemented method of claim 11, wherein the portion of the base transceiver station location data that is replaced is based on a direction opposite to a direction associated with the geographical limit associated with the base transceiver station location data.

13. The non-transitory computer implemented method of claim 6, further comprising:
using the location of the mobile device to select an advertisement for the mobile device; and
providing the selected advertisement for the mobile device.

14. The non-transitory computer implemented method of claim 13, further comprising evaluating an effectiveness of the selected advertisement based on subsequent locations of the mobile device.

15. The non-transitory computer implemented method of claim 6, further comprising displaying locations of other mobile devices on a map based on a social network application.

16. A system for mobile client-side location determination, comprising:
a mobile device comprising base transceiver station location data, a memory, a processor, and a location engine stored in the memory that, when executed by the processor:
receives information that identifies a plurality of base transceiver stations,
determines a plurality of nearby base transceiver stations based on an amplitude of a corresponding signal for each of the plurality of base transceiver stations,
reads a location for each of the plurality of nearby base transceiver stations from the base transceiver station location data,
calculates a location of the mobile device based on the location of each of the plurality of nearby base transceiver stations and a corresponding signal amplitude for each of the plurality of nearby base transceiver stations, wherein the location engine calculates the location of the mobile device in less than one second in response to at least one of a lapse of a duration of time, a use of an application on the mobile device, a call on the mobile device, and an enablement of a global positioning system, and
provides the location of the mobile device in a header of a periodic communication transmitted by the mobile device,
maintains a history of the location of the mobile device and a time associated with a calculation of the location of the mobile device, and
recalculates the location of the mobile device based on the history, wherein the location engine recalculates the location of the mobile device more frequently when the history indicates that the location has changed since a last location determination, and wherein the location engine recalculates the location of the mobile device less frequently when the history indicates that the location has not substantially changed since a last location determination.

17. The system of claim 16, wherein the base transceiver station location data is associated with a metropolitan area and comprises at least one of a base transceiver station identifier, a base transceiver station geographic location, a base transceiver station sector coverage radius, a base transceiver station antenna azimuth, a base transceiver station antenna tilt, and a base transceiver station antenna rotation.

18. The system of claim 16, wherein calculating the location of the mobile device is further based on an adjustment for a communication condition based on at least one of a subscriber demand, a sports event, an artistic performance, a time of the day, a day of the week, a school schedule, a holiday, a weather condition, a season of the year, and a tourist period.

* * * * *